(12) United States Patent
Niino et al.

(10) Patent No.: US 10,661,794 B2
(45) Date of Patent: May 26, 2020

(54) DRIVING ASSISTANCE DEVICE

(71) Applicant: DENSO CORPORATION, Kariya, Aichi-pref. (JP)

(72) Inventors: Hiroaki Niino, Kariya (JP); Masao Ohoka, Kariya (JP); Takahiro Narita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/089,988

(22) PCT Filed: Mar. 29, 2017

(86) PCT No.: PCT/JP2017/013054
§ 371 (c)(1),
(2) Date: Sep. 28, 2018

(87) PCT Pub. No.: WO2017/170766
PCT Pub. Date: Oct. 5, 2017

(65) Prior Publication Data
US 2019/0118809 A1 Apr. 25, 2019

(30) Foreign Application Priority Data
Apr. 1, 2016 (JP) .................................. 2016-074264

(51) Int. Cl.
*B60W 30/095* (2012.01)
*B60W 30/10* (2006.01)
(Continued)

(52) U.S. Cl.
CPC ........... *B60W 30/0956* (2013.01); *B60T 7/12* (2013.01); *B60T 7/22* (2013.01); *B60T 8/00* (2013.01);
(Continued)

(58) Field of Classification Search
CPC ........ B60T 2201/022; B60T 7/12; B60T 7/22; B60T 8/00; B60T 8/17; B60T 8/17558;
(Continued)

(56) References Cited

U.S. PATENT DOCUMENTS 6,339,381 B1 * 1/2002 Takikita ............... G07B 15/063
340/901
8,868,328 B1 * 10/2014 Estkowski ............. G08G 5/045
701/301
(Continued)

FOREIGN PATENT DOCUMENTS

JP H02-61798 A 3/1990
JP 2002061789 A * 2/2002
(Continued)

*Primary Examiner* — Babar Sarwar
(74) *Attorney, Agent, or Firm* — Knobbe, Martens, Olson & Bear, LLP

(57) ABSTRACT

A driving assistance device includes a recognition unit, a region setting unit, a travel setting unit, and a travel control unit. Based on the relative speed of a vehicle with respect to an object recognized by the recognition unit, the region setting unit sets a prohibited travel region where the vehicle is prohibited from entering around the object, and further sets a region of a travel path that excludes the prohibited travel region as a permitted travel region where the vehicle is to travel. The travel setting unit sets at least one of a target vehicle speed and a target travel trajectory of the vehicle that is to travel in the permitted travel region set by the region setting unit.

9 Claims, 7 Drawing Sheets

(51) Int. Cl.

| | |
|---|---|
| *B60T 8/1755* | (2006.01) |
| *B60T 8/17* | (2006.01) |
| *B60T 7/12* | (2006.01) |
| *G08G 1/16* | (2006.01) |
| *B62D 15/02* | (2006.01) |
| *B60T 7/22* | (2006.01) |
| *B60T 8/00* | (2006.01) |
| *B60W 10/04* | (2006.01) |
| *B60W 10/20* | (2006.01) |
| *B60W 30/14* | (2006.01) |

(52) U.S. Cl.
CPC .......... *B60T 8/17* (2013.01); *B60T 8/17558* (2013.01); *B60W 10/04* (2013.01); *B60W 10/20* (2013.01); *B60W 30/0953* (2013.01); *B60W 30/10* (2013.01); *B60W 30/143* (2013.01); *B62D 15/0265* (2013.01); *G08G 1/16* (2013.01); *B60T 2201/022* (2013.01); *B60W 2550/10* (2013.01); *B60W 2550/302* (2013.01); *B60W 2550/306* (2013.01); *B60W 2710/20* (2013.01); *B60W 2720/106* (2013.01)

(58) Field of Classification Search
CPC .. B60W 10/04; B60W 10/20; B60W 2550/10; B60W 2550/302; B60W 2550/306; B60W 2710/20; B60W 2720/106; B60W 30/0953; B60W 30/0956; B60W 30/10; B60W 30/143; B62D 15/0265; G08G 1/16

See application file for complete search history.

(56) References Cited

U.S. PATENT DOCUMENTS

| | | | | |
|---|---|---|---|---|
| 2009/0207046 | A1* | 8/2009 | Arrighetti | G06K 9/3258 340/937 |
| 2010/0256874 | A1* | 10/2010 | Carresjo | B60C 23/0416 701/48 |
| 2013/0314503 | A1* | 11/2013 | Nix | G06K 9/00805 348/46 |
| 2014/0118133 | A1* | 5/2014 | Oba | B60K 37/02 340/441 |
| 2015/0006099 | A1* | 1/2015 | Pham | G01C 17/38 702/93 |
| 2015/0166062 | A1* | 6/2015 | Johnson | B60W 30/12 701/41 |
| 2015/0324972 | A1* | 11/2015 | Hayakawa | H04N 7/183 348/148 |
| 2018/0056997 | A1* | 3/2018 | Ohmura | B60W 40/04 |
| 2019/0118809 | A1* | 4/2019 | Niino | B60T 7/22 |

FOREIGN PATENT DOCUMENTS

| | | | |
|---|---|---|---|
| JP | 2003-205764 A | | 7/2003 |
| JP | 2003205764 A | * | 7/2003 |
| JP | 2007-008281 A | | 1/2007 |
| JP | 2007008281 A | * | 1/2007 |
| JP | 2007-257519 A | | 10/2007 |
| JP | 2007257519 A | * | 10/2007 |
| JP | 2012-128748 | | 7/2012 |
| JP | 2012128748 A | * | 7/2012 |
| JP | 2015-203972 A | | 11/2015 |
| JP | 2015203972 A | * | 11/2015 |

* cited by examiner

DRIVING ASSISTANCE DEVICE

CROSS-REFERENCE TO RELATED APPLICATIONS

This application is the U.S. national phase of International Application No. PCT/JP2017/013054 filed Mar. 29, 2017 which designated the U.S. and claims priority to Japanese Patent Application No. 2016-74264 filed Apr. 1, 2016, the contents of which are incorporated herein by reference.

TECHNICAL FIELD

The present disclosure relates to a technique for allowing a vehicle to avoid a nearby object during travel.

BACKGROUND ART

There has been a known technique for controlling travel of a vehicle to avoid collision with the object when an object is present around the vehicle. Patent Literature (PTL) 1 indicated below discloses a technique for setting an avoidance point on each of a plurality of straight lines connecting the vehicle and detection points of the object so that the vehicle does not approach the object when an object is detected ahead of the vehicle in a direction of travel thereof. The avoidance point is set closer to the vehicle as the relative speed of the vehicle with respect to the object increases.

Furthermore, PTL 1 discloses a technique for selling a virtual white line on the vehicle side of the avoidance point, and estimating a target lane in which the vehicle is to travel based on this virtual white line and an actually detected white line or another virtual white line. With the technique disclosed in PTL 1, the vehicle aims to avoid an object present ahead through control of travel thereof in such a way as not to deviate from the estimated target lane.

CITATION LIST

Patent Literature

[PTL 1] JP 2007-008281 A

SUMMARY OF THE INVENTION

With the technique disclosed in PTL 1, the virtual straight line is set further closer to the vehicle than the avoidance point which is set closer to the vehicle than the detection point of the object is. A detailed study by the inventors revealed the problem in that this results in a reduction in the size of the target lane which is estimated based on the virtual white line, that is, a region where the vehicle is permitted to travel.

One desirable aspect of the present disclosure is to provide a technique for maximizing the size of a region where a vehicle avoids an object present around the vehicle during travel.

A driving assistance device according to one aspect of the present disclosure includes a recognition unit, a region setting unit, a travel setting unit, and a travel control unit.

The recognition unit recognizes the object and the travel path based on detection information obtained from a sensor which detects an object around a vehicle and a travel path in which the vehicle is traveling. The region setting unit sets a prohibited travel ion where the vehicle is prohibited from entering around the object based on the relative speed of the vehicle with respect to the object recognized by the recognition unit, and further sets a region of the travel path that excludes the prohibited travel region as a permitted travel region where the vehicle is to travel.

The travel setting unit sets at least one of a target vehicle speed and a target travel trajectory of the vehicle that is to travel in the permitted travel region set by the region setting unit. The travel control unit controls the vehicle travel based on at least one of the target vehicle speed and the target travel trajectory set by the travel setting unit.

The region setting unit is configured to set the prohibited travel region larger as the relative speed increases, and set the prohibited travel region smaller as the relative speed decreases.

The travel setting unit is configured to adjust the relative speed by setting the target vehicle speed such that the prohibited travel region which is set by the region setting unit based on the relative speed is of a size that allows the vehicle to avoid the prohibited travel region and travel in the permitted travel region.

With this configuration, since the prohibited travel region where the vehicle is prohibited from entering is set around the object and the region of the travel path that excludes the prohibited travel region is set as the permitted travel region where the vehicle is to travel, the permitted travel region where the vehicle avoids the object during travel can be maximized. This increases the degree of freedom when the vehicle travel is controlled to avoid the object.

Note that the reference signs in parentheses stated in the claims indicate associations with specific elements in the embodiment to be described later as one aspect and do not limit the technical scope of the present disclosure.

DESCRIPTION OF THE EMBODIMENTS

Hereinafter, an embodiment of the present disclosure will be described with reference to the drawings.

[1. Configuration]

Figure 1:
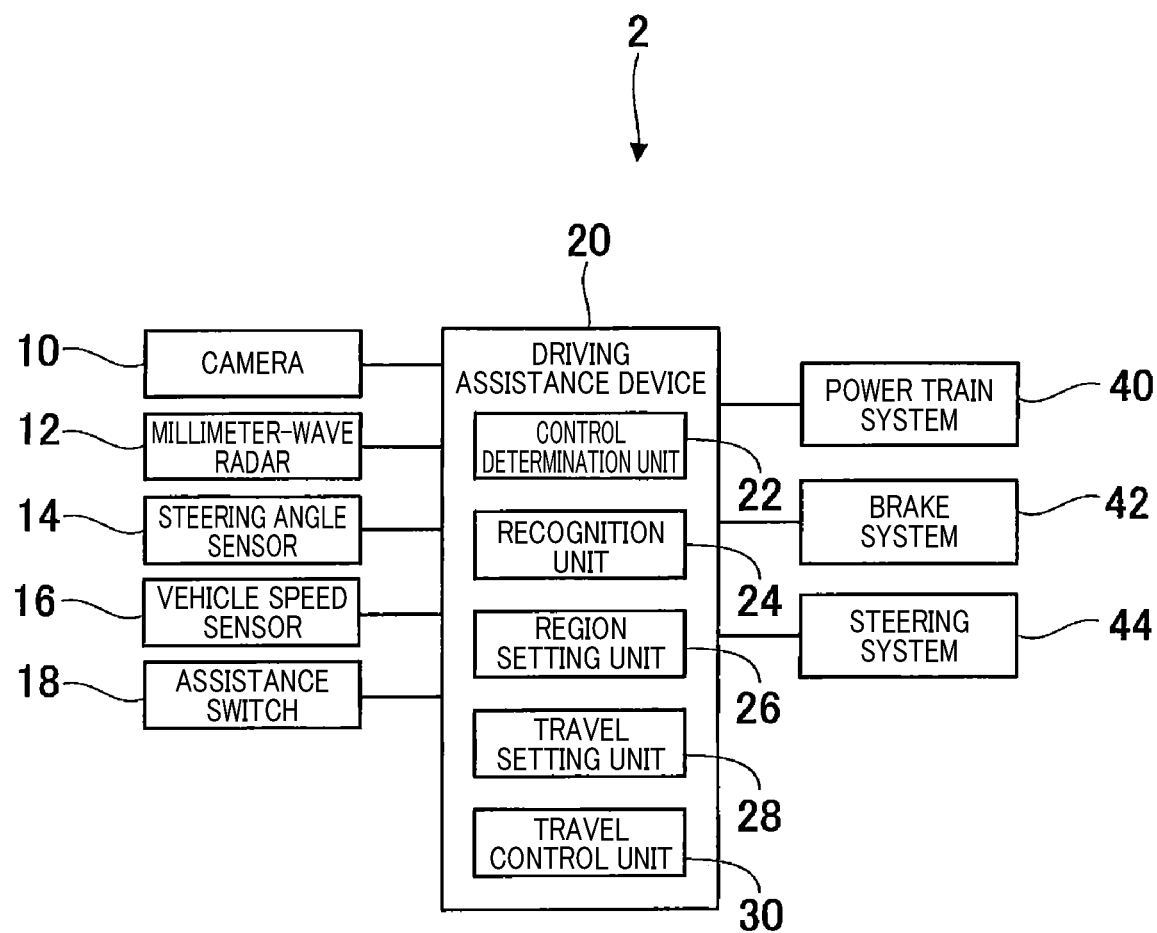
FIG. 1 is a block diagram showing a driving assistance device according to the present embodiment.

An in-vehicle driving assistance system 2 shown in FIG. 1 includes a camera 10, a millimeter-wave radar 12, a steering angle sensor 14, a vehicle speed sensor 16, an assistance switch 18, a driving assistance device 20, a powertrain system 40, a brake system 42, and a steering system 44.

The camera 10 is mounted on each of the front and the back of a vehicle, for example, and outputs image data obtained by capturing an image of a surrounding area of a vehicle 100 to the driving assistance device 20 as detection information.

The millimeter-wave radar 12 is mounted on each of the front and the back of the vehicle, for example, and calculates a distance to an object such as a pedestrian and another vehicle around the vehicle based on the time required for a transmitted millimeter wave to be received as a reflected wave that is a wave reflected from the object. Furthermore, the direction, that is, the angle, of the object with respect to the vehicle is determined according to the direction in which the reflected wave is received. The millimeter-wave radar 12 outputs the calculated distance and angle to the driving assistance device 20 as the detection information.

Note that a LIDAR which emits laser beam may be used instead of radar which emits radio waves such as the millimeter-wave radar 12.

The steering angle sensor 14 detects a steering angle of the vehicle. The vehicle speed sensor 16 detects a vehicle speed of the vehicle 100. The assistance switch 18 permits the driving assistance device 20 to control the vehicle travel so that the vehicle does not deviate from a travel path when turned on, and prohibits the driving assistance device 20 from controlling the vehicle travel when turned off.

The driving assistance device 20 includes a microcomputer including a CPU and a semiconductor memory such as a random-access memory (RAM), a read-only memory (ROM), and a flash memory. Note that the driving assistance device 20 may include one microcomputer or may include more than one microcomputer.

Various functions of the driving assistance device 20 are implemented by the CPU executing a program stored in a non-transitory tangible recording medium such as the ROM or the flash memory. Executing this program results in execution of a method corresponding to the program.

The driving assistance device 20 includes a control determination unit 22, a recognition unit 24, a region setting unit 26, a travel setting unit 28, and a travel control unit 30 as elements for the functions implemented by the CPU executing the program. The method for implementing these elements included in the driving assistance device 20 is not limited to software; a part or the whole of these elements may be implemented using hardware which combines a logic circuit, an analog circuit, and the like.

The control determination unit 22 permits the driving assistance device 20 to control the vehicle travel when the assistance switch 18 is turned on, and prohibits the driving assistance device 20 from controlling the vehicle travel when the assistance switch 18 is turned off.

The recognition unit 24 recognizes an object around the vehicle and a travel path in which the vehicle is traveling based on the detection information obtained from the camera 10 and the millimeter-wave radar 12 which detect an object around the vehicle and a travel path in which the vehicle is traveling.

Figure 2:
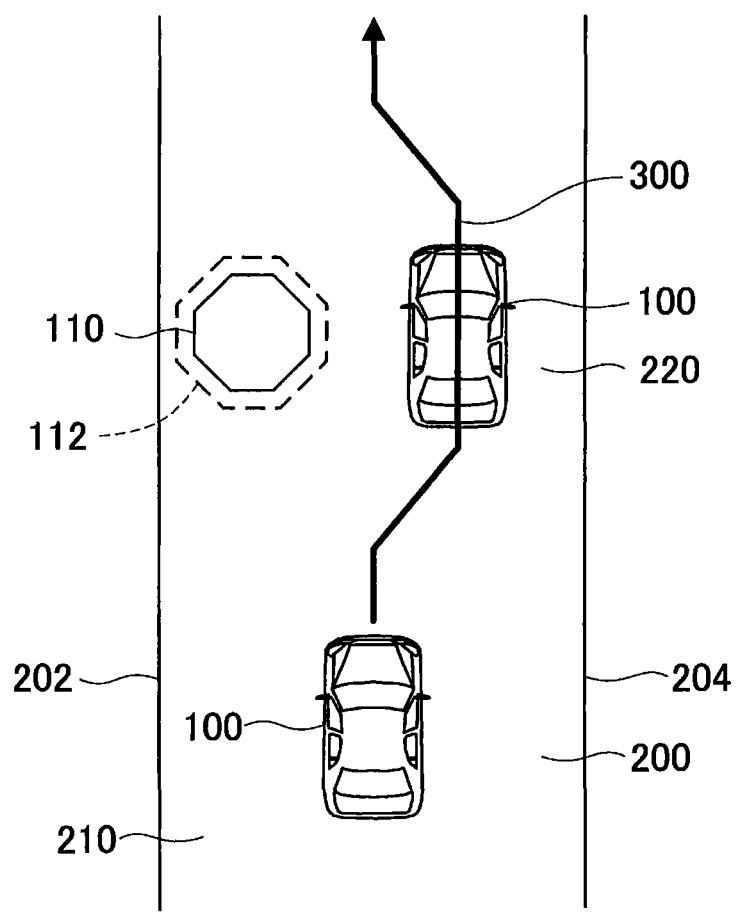
FIG. 2 is a schematic view illustrating setting of a prohibited travel region.

For example, as shown in FIG. 2, the recognition unit 24 calculates the positions of left and right white lines 202 and 204 on a road 200 on which the vehicle 100 is traveling, a lane width indicated by the distance between the white lines as the width of the travel path, the curvature of the white lines, and the like, based on image data of front and rear areas in the direction of the vehicle 100 travels obtained from the camera 10.

The recognition unit 24 recognizes a travel lane 210 as the travel path in which the vehicle 100 is traveling by recognizing the white lines 202 and 204. The recognition unit 24 recognizes the relative location of the vehicle 100 with respect to the left and right white lines 202 and 204 marking off the travel lane 210, that is, the location of the vehicle 100 in the lane width direction of the travel lane 210, based on the angles of the white lines 202 and 204, the images of which are captured by the camera 10, with respect to the vehicle 100, for example.

Furthermore, the recognition unit 24 recognizes the object present around the vehicle 100 based on the detection information of the front and rear areas in the traveling direction of the vehicle 100 is obtained from the camera 10 and the millimeter-wave radar 12. For example, the recognition unit 24 recognizes a stationary object 110 present around the travel lane 210 in which the vehicle 100 is traveling, another vehicle (not shown in the drawings) traveling in the same travel lane 210, and another vehicle (not shown in the drawings) in each of an oncoming lane and an adjacent lane which adjoins the travel lane 210.

The recognition unit 24 calculates a location of an object around the vehicle 100 and the moving speed of the object from the amount of change in the location of the object based on the image data of the front and rear areas in the vehicle travel direction obtained from the camera 10. Furthermore, the recognition unit 24 calculates the location of the object around the vehicle 100, the relative speed of the vehicle with respect to the object, and the like based on the detection information of the front and rear areas in the traveling direction of the vehicle 100 obtained from the millimeter-wave radar 12.

The relative speed of the vehicle with respect to the object indicates that the vehicle 100 is approaching the object when it is positive and that the vehicle 100 is traveling away from the object when it is negative.

The region setting unit 26 sets a prohibited travel region where the vehicle is prohibited from entering around the object, and sets the region of the travel path that excludes the prohibited travel region as a permitted travel region where the vehicle is to travel based on the travel lane for the vehicle recognized by the recognition unit 24 and the recognition result of the object around the vehicle.

For example, as shown in FIG. 2, when the recognition unit 24 recognizes the stationary object 110 such as a road construction site or a parked vehicle as an object present ahead the vehicle 100 in the direction of travel thereof, the region setting unit 26 sets around the stationary object 110 the prohibited travel region 112 which the vehicle 100 is prohibited from entering.

The region setting unit 26 sets, as a permitted travel region 220, a region between the prohibited travel region 112 and the white line 204 which is one of the white lines 202 and 204 on the opposite sides of the travel lane 210 that is more distant from the prohibited travel region 112. The permitted travel region 220 is where the vehicle 100 is to travel in the travel lane 210 except the prohibited travel region 112.

The travel setting unit 28 sets a target vehicle speed such that the prohibited travel region 112 which is set by the region setting unit 26 will be of a size that allows the vehicle 100 to avoid the prohibited travel region 112 and travel in the permitted travel region 220. When the target vehicle speed is set, the relative speed of the vehicle 100 with respect to the object around the vehicle 100 is adjusted.

Subsequently, the travel setting unit 28 sets, as a target travel trajectory 300 for the vehicle 100 to follow, a center position of the permitted travel region 220 in the width direction of the lane extending along the traveling direction of the vehicle 100. Specifically, the target travel trajectory 300 is set such that the distances of the target travel trajectory 300 to the prohibited travel region 112 and the white line 204 which mark off the permitted travel region 220 become equal.

The travel trajectory of the vehicle 100 represents the trajectory along which the location of a specific portion of the vehicle 100 changes over time as the vehicle 100 travels. For example, the specific portion of the vehicle 100 is the position of the center of gravity of the vehicle 100, the center of a front end of the vehicle 100 in the vehicle width direction, or the center of a rear end of the vehicle 100 in the vehicle width direction.

In the travel lane 210 in which no object is present and the prohibited travel region 112 has not been set, the travel lane 210 is the permitted travel region over the entire width. In this case, the travel setting unit 28 sets, as the target travel trajectory 300 for the vehicle 100 to follow, the center position in the width direction of the travel lane 210 extending along the traveling direction of the vehicle 100. Specifically, the target travel trajectory 300 is set such that the distances of the target travel trajectory 300 to the white lines 202 and 204 become equal.

When the vehicle 100 can avoid the prohibited travel region 112 and travel in the permitted travel region 220, the travel setting unit 28 sets the current vehicle speed as the target vehicle speed of the vehicle 100 which is traveling in the permitted travel region 220. When the vehicle 100 cannot avoid the prohibited travel region 112 or travel in the permitted travel region 220, the travel setting unit 28 sets the target vehicle speed lower than the current vehicle speed.

For example, when the width of the permitted travel region 220 in the lane width direction is greater than the width of the vehicle 100, the travel setting unit 28 determines that the vehicle 100 can avoid the prohibited travel region 112 and travel in the permitted travel region 220. When the width of the permitted travel region 220 in the lane width direction is less than the width of the vehicle 100, the travel setting unit 28 determines that the vehicle 100 cannot avoid the prohibited travel region 112 or travel in the permitted travel region 220.

Here, whether or not the vehicle 100 can travel in the permitted travel region 220 may be determined according to whether or not the width of the permitted travel region 220 in the lane width direction satisfies the following expression (1). In the expression (1), W1 is the width of the vehicle 100, W2 is the width of the permitted travel region 220 in the lane width direction, and ΔW is the margin for passage of the vehicle 100 through the permitted travel region 220.

$$W1 + \alpha W \leq W2 \qquad (1)$$

When the width W2 of the permitted travel region 220 satisfies the expression (1), the travel setting unit 28 determines that that the vehicle 100 can travel in the permitted travel region 220; when the width W2 of the permitted travel region 220 does not satisfy the expression (1), the vehicle 100 determines that the vehicle 100 cannot travel in the permitted travel region 220.

Figure 3:
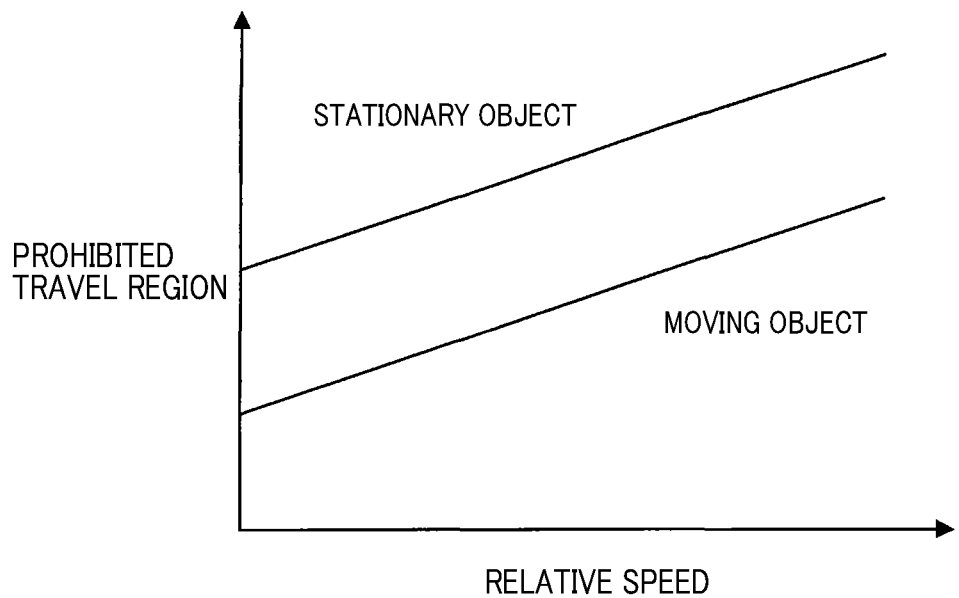
FIG. 3 is a characteristics graph showing a relationship between a relative speed, an object, and a prohibited travel region.

In FIG. 2, as the vehicle speed of the vehicle 100 is reduced, the relative speed of the vehicle 100 with respect to the stationary object 110 is reduced. As shown in FIG. 3, the region setting unit 26 reduces the size of the prohibited travel region 112 as the relative speed of the vehicle 100 with respect to the stationary object 110 is reduced. As a result, the permitted travel region 220 increases in size, and thus the vehicle 100 can avoid the prohibited travel region 112 and travel in the permitted travel region 220 without entering the prohibited travel region 112.

Note that as shown in FIG. 3, the region setting unit 26 desirably sets a larger prohibited travel region around a stationary object such as a road construction site or a parked vehicle than a prohibited travel region which the region setting unit 26 sets around a moving object such as another vehicle traveling around the vehicle. This is because when the stationary object is a mobile object such as a parked vehicle, it may suddenly start moving.

The timing at which the stationary object starts moving cannot be recognized. Therefore, avoiding the stationary object which suddenly starts moving during travel is more difficult for the vehicle 100 than avoiding the moving object during travel.

Furthermore, if there is any area undetectable by the camera 10 and the millimeter-wave radar 12 due to being blocked by the stationary object, the prohibited travel region is desirably set larger than that in a case where there is no undetectable area around the stationary object. This is because the moving object may emerge from the area undetectable by the camera 10 and the millimeter-wave radar 12 due to being blocked by the stationary object.

Since the emergence of the moving object from the area undetectable by the camera 10 and the millimeter-wave radar 12 is unpredictable, it is difficult for the vehicle 100 to avoid this moving object during travel.

The travel control unit 30 controls the power train system 40, the brake system 42, and the steering system 44 so that the vehicle 100 travels along the target travel trajectory 300 at the target vehicle speed set by the travel setting unit 28. In other words, the travel control unit 30 controls the vehicle speed and the steering angle of the vehicle.

In accordance with a drive output given as a command from the travel control unit 30, the power train system 40 controls the position of a throttle device and fuel injection volume when an internal combustion engine is mounted as a drive source, and controls power that is supplied to the motor when a motor is mounted as a drive source.

In accordance with a braking force given as a command from the travel control unit 30, the brake system 42 controls an actuator provided in a hydraulic circuit of a hydraulic brake. When a motor is mounted in the vehicle as a drive source, the brake system 42 may control, in accordance with the braking force given as a command from the travel control unit 30, power that is supplied to the motor, and generate a braking force from a regenerative brake.

In accordance with torque given as a command from the travel control unit 30, the steering system 44 drives a steering wheel to steer the vehicle.

[2. Process]

Hereinafter, the driving assistance process which the driving assistance device 20 performs will be described with reference to the flowcharts in FIGS. 4 and 5. The process in the flowchart in FIG. 4 is constantly performed at a predetermined time interval.

(1) Main Process

Figure 4:
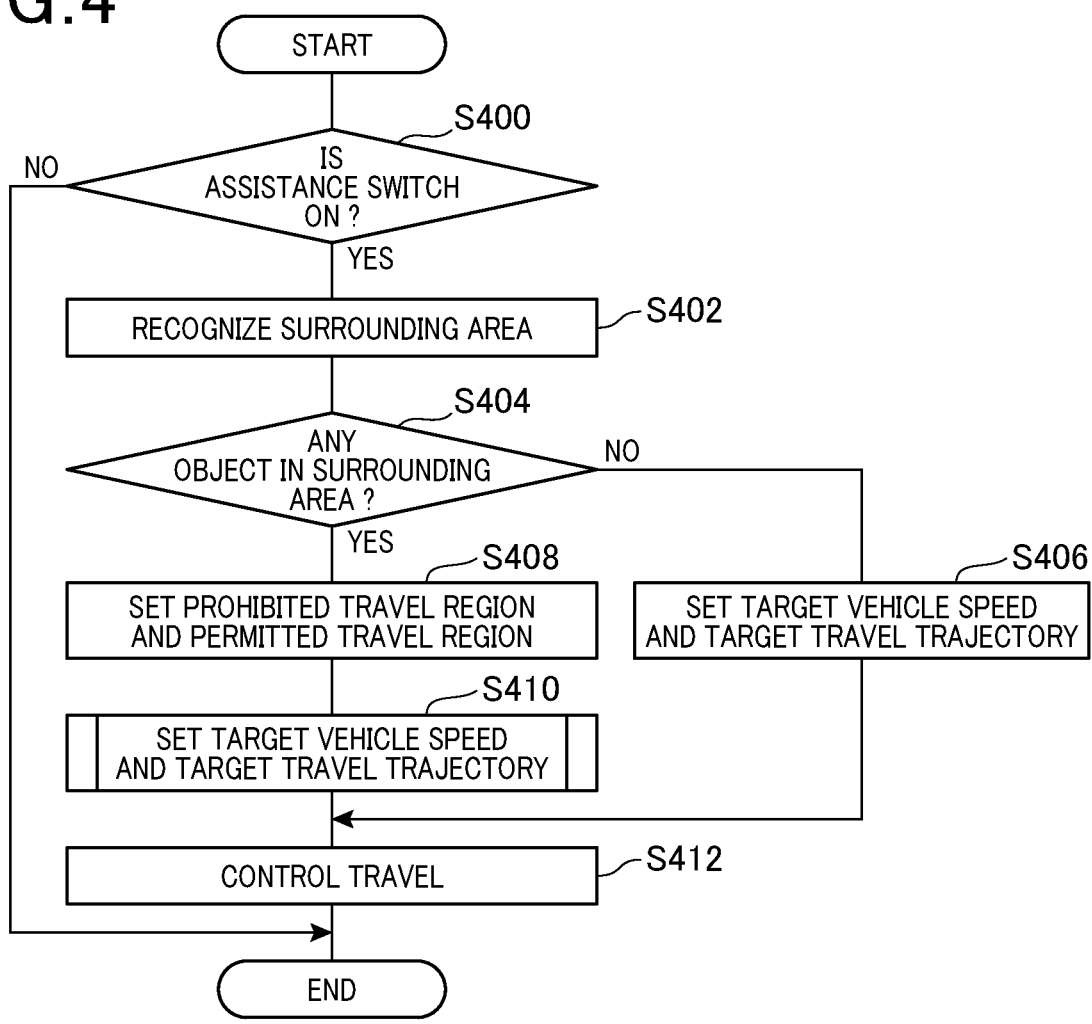
FIG. 4 is a main flowchart showing a driving assistance process.
Figure 5:
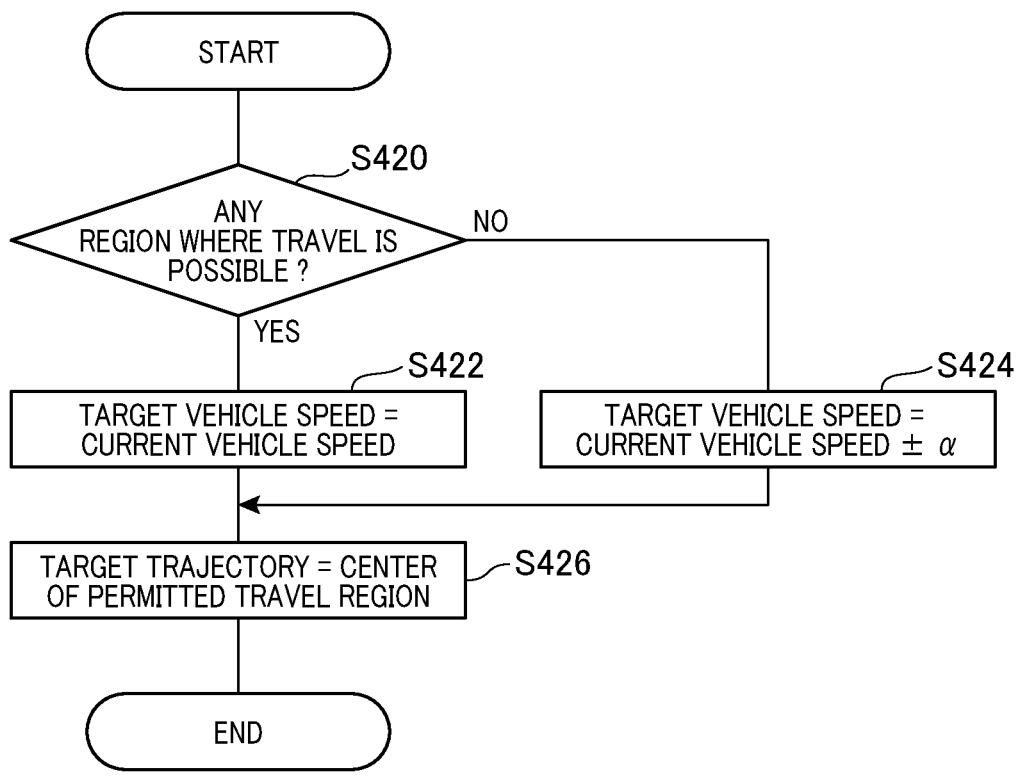
FIG. 5 is a flowchart showing a process of setting a target vehicle speed and a target travel trajectory.

In S400 in FIG. 4, the control determination unit 22 determines whether or not an output of the assistance switch 18 is ON. When the result of determination in S400 is No and the assistance switch 18 is OFF, the driving assistance device 20 is prohibited from performing the driving assistance control; thus, the present process ends.

When the result of determination in S400 is Yes and the assistance switch 18 is ON, the driving assistance device 20 is permitted to perform the driving assistance control. In this case, in S402, the recognition unit 24 recognizes an object around the vehicle and a travel path in which the vehicle is traveling based on the detection information obtained from the camera 10 and the millimeter-wave radar 12.

In S404, the recognition unit 24 determines whether or not an object is present around the vehicle. When the result of determination in S404 is No and no object is present around the vehicle, the travel setting unit 28 sets the target vehicle speed and the target travel trajectory of the vehicle in S406 based on the recognition result obtained by the recognition unit 24 in the state where no object is preset around the vehicle, and the process proceeds to S412.

In S406, the travel setting unit 28 sets a vehicle speed preset through cruise control or the like to the target vehicle speed, and sets the center position in the width direction of the travel path extending along the traveling direction of the vehicle 100 as the target travel trajectory, for example.

When the result of determination in S404 is Yes and an object is present around the vehicle, the region setting unit 26 sets the prohibited travel region where the vehicle is prohibited from entering around the object in S408. Furthermore, the region setting unit 26 sets the region of the travel path that excludes the prohibited travel region as the permitted travel region where the vehicle is to travel.

In S410, the travel setting unit 28 sets the target vehicle speed of the vehicle such that the prohibited travel region will be of a size that allows the vehicle to avoid the prohibited travel region and travel in the permitted travel region. Subsequently, the travel setting unit 28 sets the target travel trajectory of the vehicle that is to travel in the permitted travel region. The process in S410 will be described later in detail.

In S412, the travel control unit 30 controls the power train system 40, the brake system 42, and the steering system 44 based on the target vehicle speed and the target travel trajectory set in S406 or S410.

(2) Process of Setting Target Vehicle Speed and Target Travel Trajectory

The process performed in S410 in FIG. 4 will be described with reference to the flowchart in FIG. 5.

In S420, the travel setting unit 28 determines whether there is a region where the vehicle can avoid the prohibited travel region during travel, that is, whether the vehicle can travel in the permitted travel region.

When the result of determination in S420 is Yes and, for example, the vehicle 100 can avoid the prohibited travel region 112 and travel in the permitted travel region 220 as shown in FIG. 2, the travel setting unit 28 sets the current vehicle speed to the target speed in S422, and the process proceeds to S426.

When the result of determination in S420 is No and the vehicle cannot avoid the prohibited travel region or travel in the permitted travel region, the travel setting unit 28 determines whether to set the target vehicle speed higher or lower than the current vehicle speed in S424. Accordingly, the relative speed of the vehicle with respect to the object is reduced, and thus the prohibited travel region which is set around the object is reduced in size. As a result, the permitted travel region increases in size. After execution of S424, the process proceeds to S426.

Figure 6:
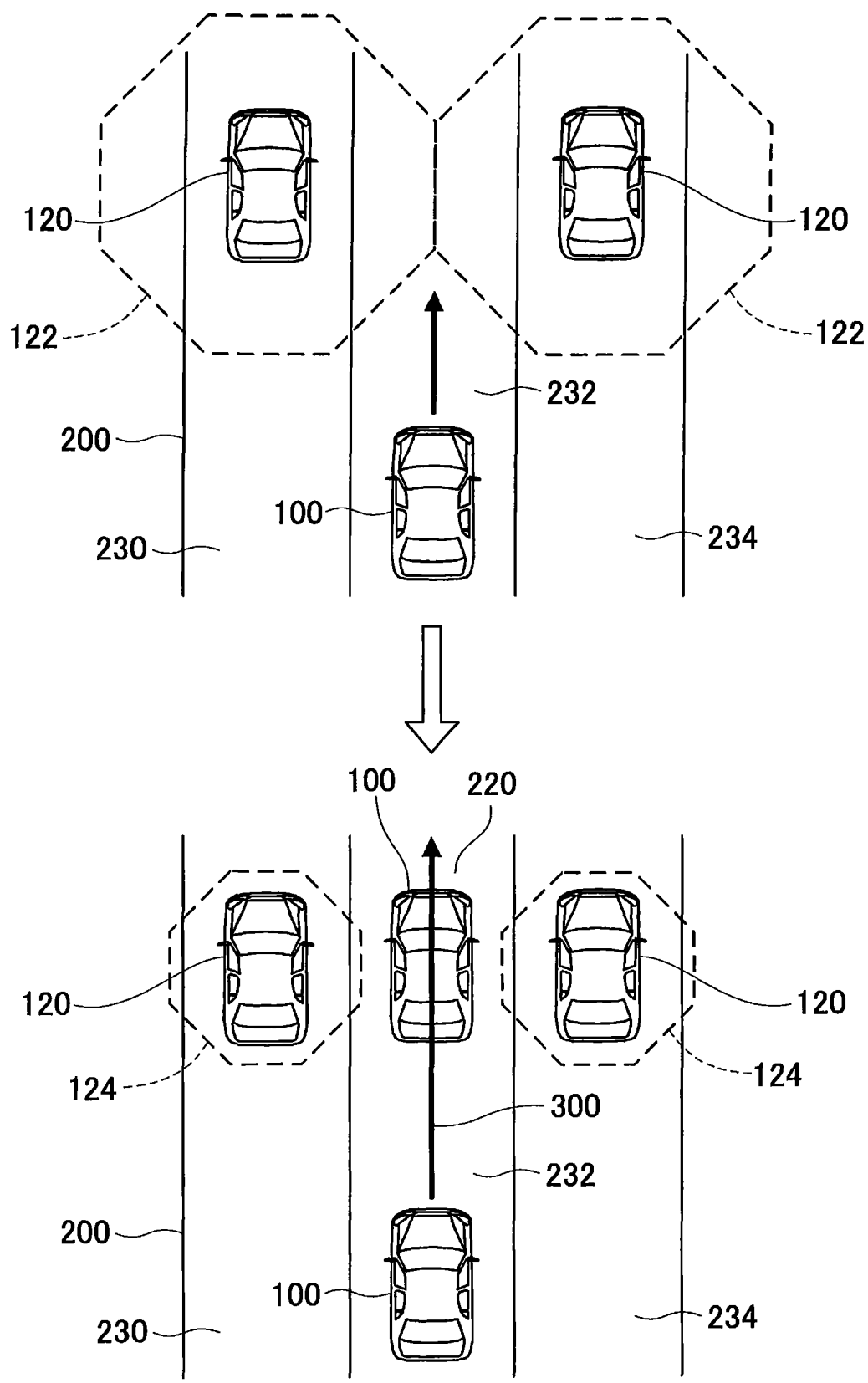
FIG. 6 is another schematic view illustrating setting of a prohibited travel region.
Figure 7:
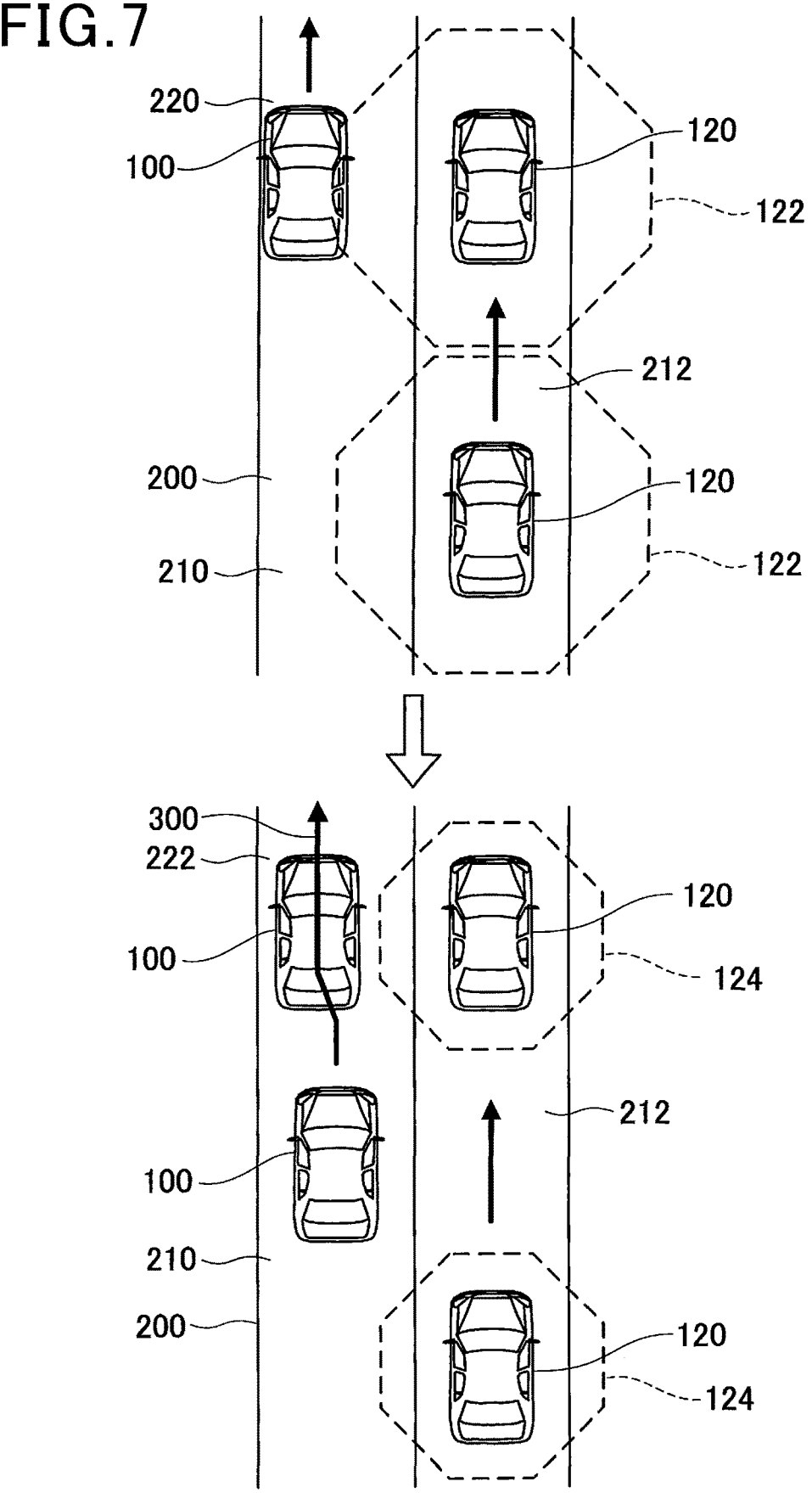
FIG. 7 is another schematic view illustrating setting of a prohibited travel region.

An upper part of FIG. 6 and an upper part of FIG. 7 show examples in which the result of determination in S420 is No and the vehicle cannot avoid the prohibited travel region or travel in the permitted travel region.

In the upper part of FIG. 6, other vehicles 120 are traveling ahead of the vehicle 100 in both left and right adjacent lanes 230 and 234 which adjoin a travel lane 232 for the vehicle 100. Since the vehicle speed of the vehicle 100 is greater than the vehicle speeds of other vehicles 120, there is no region where the vehicle 100 can avoid, during travel, the left and right prohibited travel regions 122 set around other vehicles 120 by the region setting unit 26 based on the current relative speed of the vehicle 100 with respect to other vehicles 120.

Thus, the travel setting unit 28 reduces the vehicle speed of the vehicle 100 and reduces the relative speed of the vehicle 100 with respect to the other vehicles 120. When S408 in FIG. 4 is performed based on the reduced relative speed, as shown in a lower part of FIG. 6, the prohibited travel regions 124 which are set around other vehicles 120 by the region setting unit 26 are smaller than the prohibited travel regions 122 in the upper part of FIG. 6. As a result, the permitted travel region 220 is set between the left and right prohibited travel regions 124.

Note that it is not until S408 in FIG. 4 is performed in the next step that the prohibited travel regions 124 are set based on the relative speed of the vehicle 100 with respect to other vehicles 120 which has been reduced by the travel setting unit 28 and the permitted travel region 220 is set between the left and right prohibited travel regions 124. Thus, even when the relative speed of the vehicle 100 with respect to other vehicles 120 is reduced in the current step, the prohibited travel regions 112 remain as they are, as shown in the upper part of FIG. 6.

When the prohibited travel regions 124 are set and the permitted travel region 220 is set between the left and right prohibited travel regions 124, the travel setting unit 28 sets, as the target travel trajectory 300, the center position of the permitted travel region 220 in the width direction of the lane extending along the traveling direction of the vehicle 100.

Furthermore, in the upper part of FIG. 7, another vehicle 120 approaches the vehicle 100 from behind the vehicle 100 in an adjacent lane 212 which adjoins the travel lane 210 for the vehicle 100 and is located to the right of the travel lane 210. The vehicle 100 traveling at the current relative speed cannot avoid the prohibited travel region 122 set around the other vehicle 120 by the region setting unit 26 or travel in the permitted travel region 220 when the other vehicle 120 passes the vehicle 100.

Thus, the travel setting unit 28 increases the vehicle speed of the vehicle 100 and reduces the relative speed of the vehicle 100 with respect to the other vehicle 120. When S408 in FIG. 4 is performed based on the reduced relative speed, as shown in a lower part of FIG. 7, a prohibited travel region 124 which is set around the other vehicle 120 by the region setting unit 26 is smaller than the prohibited travel region 122. As a result, the permitted travel region 222 is larger than the permitted travel region 220.

With this, when the other vehicle 120 passes the vehicle 100, the vehicle 100 can avoid the prohibited travel region 124 and travel in the permitted travel region 222.

Also, in FIG. 7, similar to the case in FIG. 6, it is not until S408 in FIG. 4 is performed in the next step that the prohibited travel region 124 is set based on the reduced relative speed and the permitted travel region 222 which is larger than the permitted travel region 220 is set. Thus, even when the relative speed is reduced in the current step, the prohibited travel region 112 remains as it is, as shown in the upper part of FIG. 7.

Figure 8:
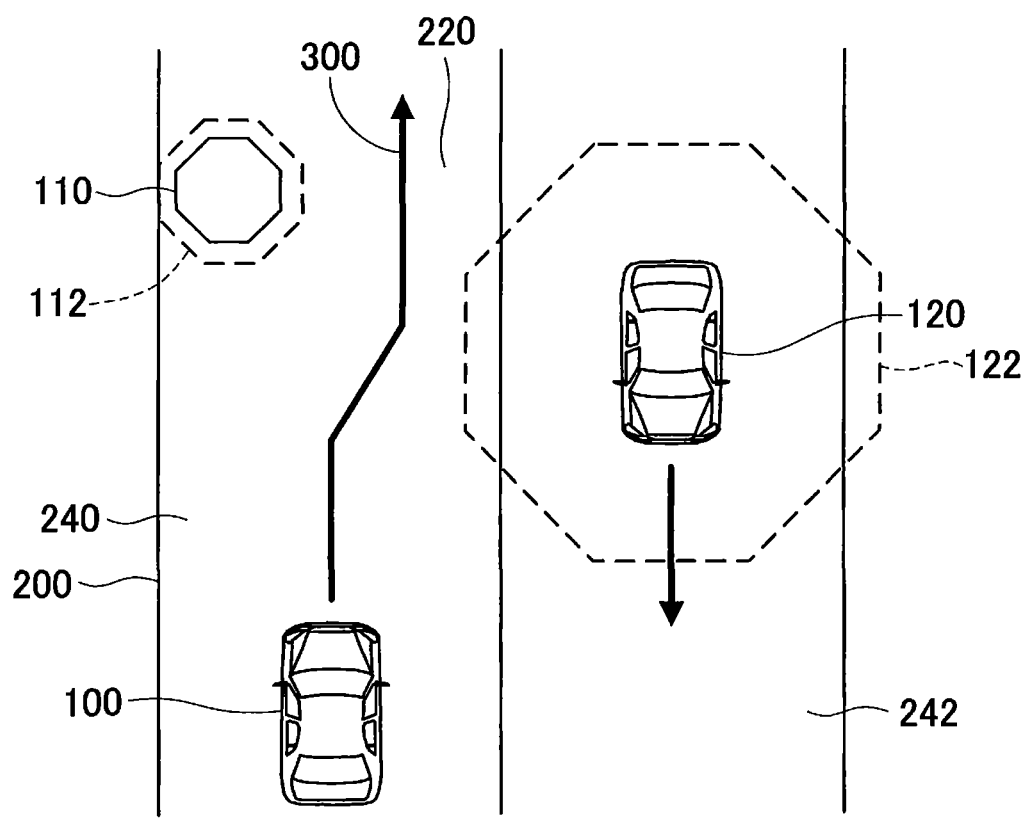
FIG. 8 is another schematic view illustrating setting of a prohibited travel region.

Here, when another vehicle 120 is traveling in an oncoming lane 242 of traffic opposite the travel lane 240 in which the vehicle 100 is traveling as shown in FIG. 8, the vehicle 100 and the other vehicle 120 travel in different lanes, and thus it may be determined that the vehicle 100 does not need to avoid the other vehicle 120.

Based on this determination, even when the prohibited travel region 122 which is set around the other vehicle 120 based on the relative speed of the vehicle 100 with respect to the other vehicle 120 enters the travel lane 210 for the vehicle 100, the prohibited travel region 122 can be ignored.

Therefore, the region setting unit 26 sets the permitted travel region 220 for the vehicle 100 only based on the prohibited travel region 112 set around the stationary object 110 that is present in the travel lane 210, ahead of the vehicle 100 in the direction of travel thereof.

In S426, the travel setting unit 28 sets, as the target travel trajectory, the center position of the permitted travel region set in S408 in FIG. 4 in the width direction of the lane extending along the traveling direction of the vehicle 100.

[3. Advantageous Effects]

The following advantageous effects are obtained according to the foregoing embodiment described above.

(1) Since the region of the travel path that excludes the prohibited travel region which is set around an object and the vehicle 100 is prohibited from entering is set as the permitted travel region where the vehicle 100 is to travel, the permitted travel region where the vehicle 100 avoids the object during travel can be maximized. This increases the degree of freedom when the vehicle travel 100 is controlled to avoid the object.

(2) When the vehicle 100 cannot avoid the prohibited travel region or travel in the permitted travel region, the vehicle 100 can easily avoid the object during travel through a simple control in which the target vehicle speed of the vehicle 100 is set so that the relative speed is reduced.

(3) Since the prohibited travel region is set larger when the object is stationary than when the object is in motion, the vehicle 100 can avoid the object during travel even when the stationary object suddenly starts moving.

(4) If there is any area undetectable by the camera 10 and the millimeter-wave radar 12 due to being blocked by the stationary object, the prohibited travel region is set larger than that in the case where there is no undetectable area. With this, even when another object emerges from behind the stationary object, the vehicle 100 can avoid the emerged object during travel.

In the foregoing embodiment described above, the camera 10 and the millimeter-wave radar 12 correspond to a sensor, the stationary object 110 and the other vehicle 120 correspond to an object present around the vehicle, and the travel lanes 210, 232, and 240 correspond to the travel path in which the vehicle is traveling.

Furthermore, in the foregoing embodiment, S402 corresponds to a process that is performed by the recognition unit 24, S408 corresponds to a process that is performed by the region setting unit 26, S406, S410, and S420 to S426 correspond to a process that is performed by the travel setting unit 28, and S412 corresponds to a process which is performed by the travel control unit 30.

[4. Other Embodiments]

(1) In the foregoing embodiment, the travel path in which the vehicle 100 is traveling is exemplified as the travel lane marked off by white lines. On a road with no white lines, a road surface marked off by a step indicating the boundary between the road and an area outside the road, or an unpaved surface, a wall, or the like may be recognized as the travel path.

(2) The driving assistance device 20 may set the size of the prohibited travel region according to the type of the object. For example, in a case where the object is a person, the driving assistance device 20 sets the prohibited travel region larger than that in a case where the object is not a person.

(3) In FIG. 6, the driving assistance device 20 sets the prohibited travel regions 122 and 124 around the other vehicles 120 which are traveling, in the same direction as the vehicle 100, in the adjacent lanes 230 and 234 which adjoin the vehicle 100. Furthermore, in FIG. 7, the driving assistance device 20 sets the prohibited travel regions 122 and 124 around the other vehicle 120 which is traveling, in the same direction as the vehicle 100, in the adjacent lane 212 which adjoins the vehicle 100.

In contrast, the driving assistance device 20 may determine that the vehicle 100 does not need to avoid the other vehicle 120 which is traveling in a lane different from the travel lane for the vehicle 100 during travel; the driving assistance device 20 does not need to set the prohibited travel region.

(4) The driving assistance device 20 may set at least one of the target vehicle speed and the target travel trajectory of the vehicle in order to allow the vehicle to avoid the prohibited travel region and travel in the permitted travel region.

For example, in FIG. 2, the vehicle 100 can travel in the permitted travel region 220 set based on the current vehicle speed of the vehicle 100. Therefore, the driving assistance device 20 does not need to change the target vehicle speed; it is sufficient that the driving assistance device 20 sets only the target travel trajectory 300 of the vehicle 100 that is traveling in the permitted travel region 220 in order to avoid the stationary object 110.

Further, in FIG. 6, the driving assistance device 20 can set the permitted travel region 220 in which the vehicle 100 can travel by setting only the target vehicle speed lower than the current vehicle speed without changing the target travel trajectory of the vehicle 100.

(5) In the foregoing embodiment, the camera 10 and the millimeter-wave radar 12 are used as sensors. In contrast, the sensor may be either the camera 10 or the millimeter-wave radar 12 alone, for example. Furthermore, as the sensor, another sensor may be added to the camera 10 and the millimeter-wave radar 12, or a sensor different from the camera 10 and the millimeter-wave radar 12 may be used.

(6) A plurality of functions of one structural element in the foregoing embodiments may be implemented by more than one structural element, and one function of one structural element in the foregoing embodiments may be implemented by more than one structural element. Furthermore, a plurality of functions of more than one structural element may be implemented by one structural element, and one function implemented by more than one structural element may be implemented by one structural element. Furthermore, a portion of the configurations in the foregoing embodiments may be omitted. Furthermore, at least a portion of the configuration in each of the foregoing embodiments may be added to the configuration in another one of the foregoing embodiments or may be replaced by the configuration in another one of the foregoing embodiments. Note that all embodiments included in the technical idea specified by only the wording of the claims are embodiments of the present disclosure.

(7) The present disclosure can be implemented in various forms including not only the driving assistance device 20 described above, but also the driving assistance system 2 which includes the driving assistance device 20 as a structural element, a driving assistance program for causing a computer to function as said driving assistance device 20, a recording medium on which this driving assistance program is recorded, and a driving assistance method.

The invention claimed is:

1. A driving assistance device comprising:
   one or more processors;
   a memory storing instructions that when executed by the one or more processors causes the driving assistance device to perform processes comprising:
   a recognition process which recognizes an object and a travel path based on detection information obtained from a sensor which detects the object and the travel path, the object being present around a vehicle, the travel path being where the vehicle is traveling;
   a region setting process which sets a prohibited travel region around the object based on a relative speed of the vehicle with respect to the object recognized by the recognition process, and further sets a region of the travel path that excludes the prohibited travel region as a permitted travel region, the prohibited travel region being where the vehicle is prohibited from entering, the permitted travel region being where the vehicle is to travel;
   a travel setting process which sets at least one of a target vehicle speed and a target travel trajectory of the vehicle which is traveling in the permitted travel region set by the region setting process; and
   a travel control process which controls the vehicle travel based on at least one of the target vehicle speed and the target travel trajectory set by the travel setting process, wherein
   the region setting process sets the prohibited travel region larger as the relative speed increases, and sets the prohibited travel region smaller as the relative speed decreases; and
   the travel setting process adjusts the relative speed by setting the target vehicle speed such that the prohibited travel region which is set by the region setting process based on the relative speed is of a size that allows the vehicle to avoid the prohibited travel region and travel in the permitted travel region.

2. The driving assistance device according to claim 1, wherein
   the recognition process recognizes whether the object is stationary or in motion, and
   the region setting process sets the prohibited travel region larger when the object is stationary than when the object is in motion.

3. The driving assistance device according to claim 2, wherein
   the region setting process sets, around the object that is stationary, the prohibited travel region that is larger when the recognition process recognizes that there is an area undetectable by the sensor due to being blocked by the object that is stationary than when the area is absent.

4. The driving assistance device according to claim 1, wherein
   the travel setting process sets the target vehicle speed lower than a current vehicle speed of the vehicle when the vehicle is unable to avoid the prohibited travel region located ahead in a traveling direction during travel, so that the prohibited travel region ahead in the traveling direction is reduced in size.

5. The driving assistance device according to claim 1, wherein
   when another vehicle around which the prohibited travel region has been set by the region setting process approaches the vehicle from behind in a traveling direction of the vehicle, and the when vehicle cannot avoid the prohibited travel region set around the other vehicle approaching from behind in the traveling direction during travel, the travel setting process sets the target vehicle speed higher than a current vehicle speed of the vehicle so that the prohibited travel region is reduced in size.

6. The driving assistance device according to claim 1, wherein
   the region setting process sets the prohibited travel region for the object that is at least partially present in the travel path and not set the prohibited travel region for the object that is present outside the travel path.

7. The driving assistance device according to claim 1, wherein
   the recognition process recognizes a travel lane in which the vehicle is traveling as the travel path based on a white line detected by the sensor.

8. The driving assistance device according to claim 1, wherein
   the travel setting process sets a center position of the permitted travel region in a width direction of the travel path extending along a direction of the vehicle travel as the target travel trajectory.

9. A driving assistance method comprising:
   recognizing an object and a travel path based on detection information obtained from a sensor which detects the object and the travel path, the object being present around a vehicle, the travel path being where the vehicle is traveling;
   setting a prohibited travel region around the object based on a relative speed of the vehicle with respect to the recognized object, the prohibited travel region being where the vehicle is prohibited from entering;
   setting a region of the travel path that excludes the prohibited travel region as a permitted travel region, the permitted travel region being where the vehicle is to travel;
   setting at least one of a target vehicle speed and a target travel trajectory of the vehicle which is traveling in the permitted travel region;
   controlling vehicle travel based on at least one of the target vehicle speed and the target travel trajectory;
   setting the prohibited travel region includes setting the prohibited travel region larger as the relative speed increases, and setting the prohibited travel region smaller as the relative speed decreases; and
   adjusting the relative speed by setting the target vehicle speed such that the prohibited travel region is of a size that allows the vehicle to avoid the prohibited travel region and travel in the permitted travel region.

* * * * *